(12) United States Patent
Reiner et al.

(10) Patent No.: US 8,838,556 B1
(45) Date of Patent: Sep. 16, 2014

(54) MANAGING DATA SETS BY REASONING OVER CAPTURED METADATA

(75) Inventors: David Stephen Reiner, Lexington, MA (US); Nihar Nanda, Acton, MA (US); John Daniel Hushon, Medfield, MA (US)

(73) Assignee: EMC Corporation, Hopkinton, MA (US)

( * ) Notice: Subject to any disclaimer, the term of this patent is extended or adjusted under 35 U.S.C. 154(b) by 89 days.

(21) Appl. No.: 13/336,613

(22) Filed: Dec. 23, 2011

Related U.S. Application Data (60) Provisional application No. 61/529,087, filed on Aug. 30, 2011.

(51) Int. Cl.
G06F 7/00 (2006.01)
G06F 17/00 (2006.01)

(52) U.S. Cl.
USPC .......................................... 707/694; 707/702

(58) Field of Classification Search
None
See application file for complete search history.

(56) References Cited

U.S. PATENT DOCUMENTS

2003/0234812 A1* 12/2003 Drucker et al. ................ 345/751
2006/0195516 A1* 8/2006 Beaupre ......................... 709/203
2010/0063877 A1* 3/2010 Soroca et al. ............... 705/14.45

OTHER PUBLICATIONS

S. Bechhofer et al., "OWL Web Ontology Language Reference," W3C Recommendation, Feb. 2004, 80 pages.
W3C OWL Working Group, "OWL 2 Web Ontology Language Document Overview," W3C Recommendation, Oct. 2009, 12 pages.
F. Manola et al., "RDF Primer," W3C Recommendation, Feb. 2004, 60 pages.
U.S. Appl. No. 12/495,215 filed in the name of John D. Hushon on Jun. 30, 2009 and entitled "Context-Driven Model Transformation for Query Processing."

* cited by examiner

Primary Examiner — Fred I Ehichioya
Assistant Examiner — Jau-Shya Meng
(74) Attorney, Agent, or Firm — Ryan, Mason & Lewis, LLP

(57) ABSTRACT

A data set manager is configured to interact with data processing elements of an information processing system. The data set manager comprises a metadata capture module configured to access or otherwise obtain metadata characterizing data sets associated with the data processing elements, a reasoning module configured to perform one or more reasoning operations on the metadata, and an action recommendation module configured to identify one or more recommended actions for the data processing elements based at least in part on results of the reasoning operations. The metadata characterizes properties of the data sets and relationships among the data sets, and may be defined in accordance with at least one of a specified ontology and a specified class. The data set manager and associated data processing elements may be implemented, by way of example, in cloud infrastructure of a cloud service provider, or on another type of processing platform.

20 Claims, 5 Drawing Sheets

300 DATA SET
- HISTORY
  - CREATION
    - HOW CREATED
    - WHO CREATED
    - WHEN CREATED
  - OWNERSHIP
  - LOCATION
  - DERIVATION AND TRANSFORMATION
- CLASSIFICATION WRT VARIOUS SCHEMES
- CONTENT
- STATE (SOURCE, STREAM, ...)
- IMPORTANCE
- SECURITY
- CURRENCY
- VOLATILITY
- CONFIDENTIALITY
- VALIDITY
- ...

FIG. 5

DATA SET 300
- DERIVATION
  - COPY
  - SNAPSHOT
  - CLONE
- TRANSFORMATION
  - SELECT (e.g., ROWS)
  - PROJECT (e.g., COLUMNS)
  - INDEX
  - TAG, CLASSIFY
- CONSISTENCY
  - STRONG, LAG, EVENTUAL
- FIDELITY
  - COMPLETENESS
  - CURRENCY
- SUBSTITUTABILITY

MANAGING DATA SETS BY REASONING OVER CAPTURED METADATA

PRIORITY CLAIM

This application claims priority to U.S. Provisional Patent Application Ser. No. 61/529,087, filed Aug. 30, 2011 and entitled "A system for integration, rendering, and purpose-based use of heterogeneous data from multiple sources," which is commonly owned herewith and incorporated by reference herein.

FIELD

The field relates generally to information processing systems, and more particularly to data management techniques utilized within such systems.

BACKGROUND

An increasing number of companies and other enterprises are reducing their costs by migrating portions of their information technology infrastructure to cloud service providers. For example, virtual data centers and other types of systems comprising distributed virtual infrastructure are coming into widespread use. Commercially available virtualization software such as VMware® VSphere™ may be used by cloud service providers to build a variety of different types of virtual infrastructure, including private and public cloud computing and storage systems, which may be distributed across hundreds of interconnected computers, storage devices and other physical machines. Typical cloud service offerings include, for example, Infrastructure-as-a-Service (IaaS), Platform-as-a-Service (PaaS), and Software-as-a-Service (SaaS).

In cloud-based information processing system arrangements of the type described above, a wide variety of different hardware and software products are often deployed, many of which may be from different vendors, resulting in a complex system configuration. As the complexity of such cloud infrastructure increases, the need for accurate and efficient management of data has also grown.

Conventional approaches to data management in cloud infrastructure and other types of complex information technology (IT) infrastructure are deficient in a number of respects. For example, many data management techniques take a fragmented or partial approach to handling issues such as data provenance, versioning, volatility, derivation, indexing, materialization and state. As a result, expressions such as policies, assertions, constraints and rules relating to the data are often neither visible nor accessible, and accordingly can be difficult to assess, enforce and audit. For example, expressions of this type may be hidden in procedural code and schedules, which are hard to change. This unduly limits the actions that can be taken, and may raise doubts about the validity of data analyses.

It is therefore often necessary to make assumptions regarding the data to be managed, which can be problematic. For example, optimistic assumptions are made in some cases (e.g., "let's assume the information is current") while pessimistic ones are made in other cases (e.g., "there's an old timestamp on the file, so let's go back to the source instead"). Such assumptions may be inaccurate and can substantially undermine system performance when carrying out a variety of common data processing operations.

SUMMARY

Illustrative embodiments of the present invention provide techniques for managing data sets by reasoning over metadata. Such data set based reasoning provides accurate and efficient support for a wide variety of important use cases in information processing systems, including, by way of example, determining one or more of the data sets that would be best suited for a specified use, and determining if at least one policy related to one or more of the data sets is satisfied.

In one embodiment, a data set manager is configured to interact with data processing elements of an information processing system. The data set manager comprises a metadata capture module configured to access or otherwise obtain metadata characterizing data sets associated with the data processing elements, a reasoning module configured to perform one or more reasoning operations on the metadata, and an action recommendation module configured to identify one or more recommended actions for the data processing elements based at least in part on results of the reasoning operations. The metadata characterizes properties of the data sets and relationships among the data sets, and may be defined in accordance with at least one of a specified ontology and a specified class. The data set manager and associated data processing elements may be implemented, by way of example, in cloud infrastructure of a cloud service provider, or on another type of processing platform.

One or more of the illustrative embodiments advantageously overcome the above-noted drawbacks of conventional approaches. For example, by performing reasoning operations over metadata characterizing data sets of an information processing system, better decisions can be made regarding operating policies or other parameters of the system, leading to improved performance.

DETAILED DESCRIPTION

Illustrative embodiments of the present invention will be described herein with reference to exemplary information processing systems and associated computers, servers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
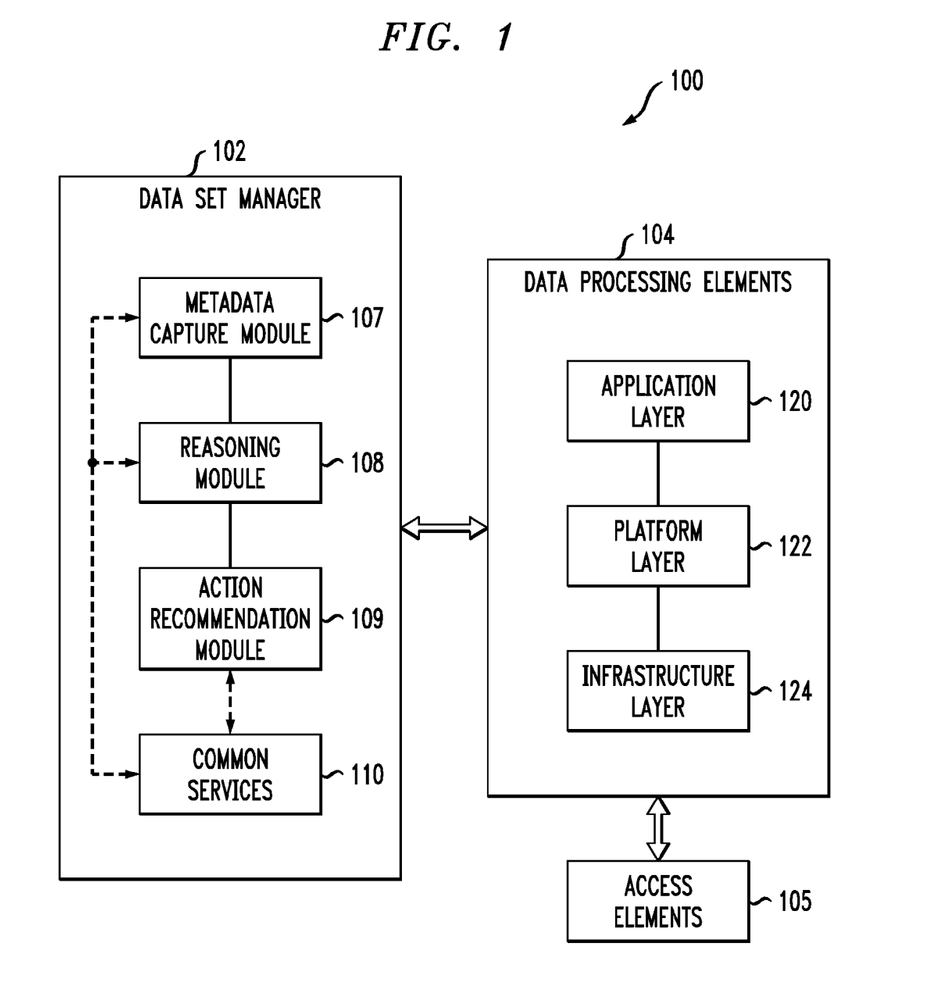
FIG. 1 is a block diagram of an information processing system having a data set manager in an illustrative embodiment of the invention.

FIG. 1 shows an information processing system 100 configured in accordance with an illustrative embodiment of the present invention. The information processing system 100 comprises a data set manager 102 in communication with data processing elements 104 implemented in IT infrastructure of the system 100. One or more of the data processing elements 104 are accessible to external entities via access elements 105. For example, in a cloud-based system embodiment in which the data processing elements comprise elements of cloud infrastructure of the system, external devices such as tenant terminals may access the data processing elements 104 via the access elements 105. The access elements may comprise one or more networks as well as associated interface devices.

A "data set" as the term is used herein may be viewed as an abstraction of one or more data items, such as a table, document, file or other data item or combinations thereof, where the given data set is characterized by properties as well as relationships to other data sets. These properties and relationships are captured by metadata that is associated with the data set in the system 100.

The data set manager 102 in the present embodiment is configured to provide tracking and reasoning over data set interrelationships, driven by explicit ontological representations. This allows semantic expression and evaluation of many key aspects of data set manipulation, from provenance and consistency to currency, security and state. In turn, the evaluation of explicit policies, assertions, constraints and rules about data sets can drive actions that avoid problems with data sets and increase user confidence in them.

The data set manager 102 comprises a metadata capture module 107, a reasoning module 108 and an action recommendation module 109. The metadata capture module 107 is configured to obtain metadata characterizing data sets associated with the data processing elements 104. It should be noted that the term "capture" as used herein is intended to be broadly construed, so as to encompass, for example, any of a variety of techniques for accessing or otherwise obtaining metadata, including, as one possible example, capturing metadata in a common store. As will be described in conjunction with FIGS. 3, 4 and 5 below, the metadata characterizes properties of the data sets and relationships among the data sets, and may be defined in accordance with at least one of a specified ontology and a specified class. The reasoning module 108 is configured to perform one or more reasoning operations on the metadata. The action recommendation module 109 is configured to identify one or more recommended actions for the data processing elements 104 based at least in part on results of the reasoning operations. The data set manager 102 may communicate with one or more of the data processing elements 104 via a conventional network connection or other suitable interface.

Also included in the data set manager 102 in the present embodiment is a set of common services 110, at least portions of which are accessible to and utilized by each of the modules 107, 108 and 109. Examples of common services will be described in more detail below in conjunction with FIG. 2.

The data processing elements 104 may be viewed as being arranged in layers including an application layer 120, a platform layer 122 and an infrastructure layer 124. For example, these layers may be used to provide respective SaaS, PaaS and IaaS cloud services in an embodiment in which data processing elements 104 comprise cloud infrastructure. Such cloud infrastructure may be viewed as comprising physical infrastructure and associated virtualization infrastructure running on the physical infrastructure.

It is to be appreciated, however, that embodiments of the invention can be implemented without the use of cloud infrastructure. For example, the data set manager 102 and data processing elements 104 may be part of an enterprise storage network or other IT infrastructure associated with a single enterprise. The processing elements 104 may therefore be associated with any type of IT infrastructure.

The data set manager 102 and the data processing elements 104 may be implemented on a common processing platform or on separate processing platforms. Examples of processing platforms suitable for implementing at least a portion of these and other elements of system 100 will be described below in conjunction with FIGS. 6 and 7. A given such processing platform comprises at least one processing device comprising a processor coupled to a memory, and the processing device may be implemented at least in part utilizing a virtual machine, although other embodiments need not utilize any virtualization.

Also, although shown in FIG. 1 as being separate from the data processing elements 104, at least a portion of one or more of the data set manager 102 and the access elements 105 may be implemented within one or more of the data processing elements 104. It is also to be understood that a given embodiment of the system 100 may include multiple instances of the data set manager 102, although only a single instance of the data set manager is shown in the system diagram for clarity and simplicity of illustration.

Figure 2:
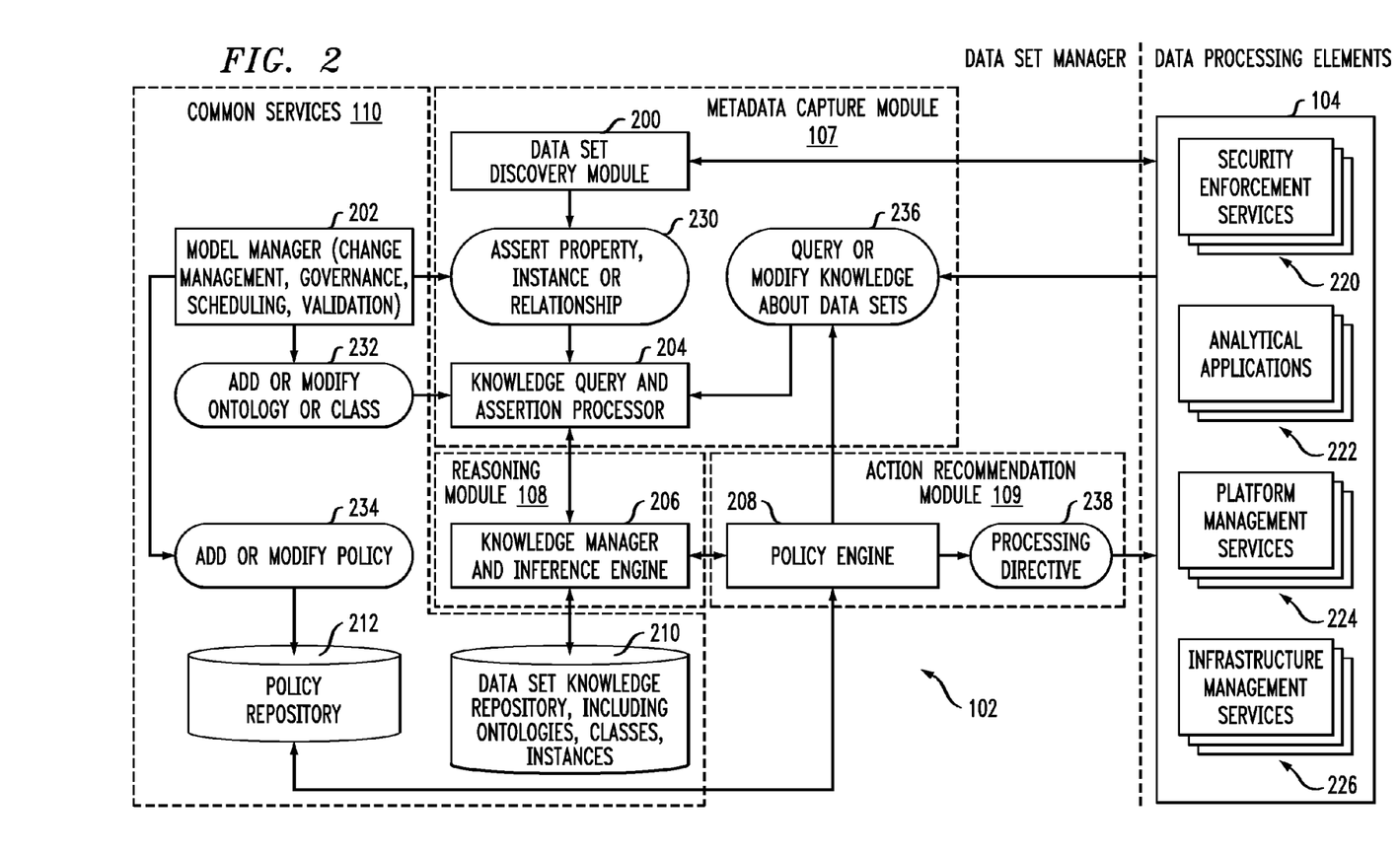
FIG. 2 shows a more detailed view of a portion of the FIG. 1 system.

Referring now to FIG. 2, a portion of the information processing system 100 is shown in greater detail. In this embodiment, the data set manager 102 comprises a data set discovery module 200, a model manager 202, a knowledge query and assertion processor 204, a knowledge manager and inference engine 206, and a policy engine 208. The knowledge manager and inference engine 206 has an associated data set knowledge repository 210 that includes ontologies, classes and instances relating to data sets. The policy engine 208 has an associated policy repository 212.

The data processing elements 104 in this embodiment comprise security enforcement services 220, analytical applications 222, platform management services 224 and infrastructure management services 226.

Exemplary operations performed by these components of the data set manager 102 include an assert property, instance or relationship operation 230, an add or modify ontology or class operation 232, an add or modify policy operation 234, a query or modify knowledge about data sets operation 236, and a processing directive operation 238.

The components of the FIG. 2 diagram may be mapped to the modules 107, 108, 109 and 110 of the data set manager 102 in the following manner, as illustrated by dashed lines in the diagram. By way of example, the metadata capture module 107 may be viewed as comprising the data set discovery module 200, the knowledge query and assertion processor 204, and operations 230 and 236. The reasoning module 108 may comprise the knowledge manager and inference engine 206. The action recommendation module 109 may comprise the policy engine 208 and operation 238. The common services 110 may comprise model manager 202, data set knowledge repository 210, policy repository 212, and operations 232 and 234. Of course, other arrangements of additional or alternative components and operations may be associated with the modules 107, 108, 109 and 110 in other embodiments. In the present embodiment, as mentioned previously, the modules 107, 108 and 109 all make use of at least a portion of the common services 110.

The data set discovery module 200 interacts with the data processing elements 104 in order to obtain metadata characterizing data sets to be managed. The model manager 202 generates one or more models specifying structural, semantic and format characteristics of the metadata, and is also responsible for functions such as change management, governance, scheduling and validation.

Examples of models and model generation techniques that may be utilized in embodiments of the invention are disclosed in U.S. patent application Ser. No. 12/495,215, filed Jun. 30, 2009 and entitled "Context-Driven Model Transformation for Query Processing," which is commonly owned herewith and incorporated by reference herein.

As one possible illustration, one or more models or other portions of the system 100 may be implemented using the Resource Description Framework (RDF) of the World Wide Web Consortium (W3C). RDF is a language for representing information about resources in the web. It identifies such resources using Uniform Resource Identifiers (URIs) and models statements about the resources as a directed graph. A given such statement is represented by the elements (Subject, Predicate, Object), also referred to as an RDF triple.

Additional details regarding RDF are described in the following W3C Recommendations, all dated Feb. 10, 2004 and incorporated by reference herein: RDF/XML Syntax Specification (Revised); RDF Vocabulary Description Language 1.0: RDF Schema; RDF: Concepts and Abstract Syntax; RDF Semantics; and RDF Test Cases. See also W3C Recommendation RDFa in XHTML: Syntax and Processing, Oct. 14, 2008, which is also incorporated by reference herein.

Embodiments of the invention may also make use of a Web Ontology Language, as described in, for example, OWL 2 Web Ontology Language Document Overview, W3C Recommendation 27, Oct. 2009, which is incorporated by reference herein. The OWL 2 Web Ontology Language is an ontology language for the Semantic Web. OWL 2 ontologies generally provide classes, properties, individuals, and data values and are stored as Semantic Web documents. OWL 2 ontologies can be used along with information written in RDF, and OWL 2 ontologies themselves are primarily exchanged as RDF documents. It is to be appreciated, however, that RDF or OWL are not requirements of any particular embodiment of the invention.

Both the data set discovery module 200 and the model manager 202 can assert a property, instance or relationship relating to one or more data sets via operation 230. This operation can also be performed by knowledge query and assertion processor 204 and knowledge manager and inference engine 206, although this is not expressly shown in FIG. 2. The model manager 202 in the present embodiment can add or modify one or more ontologies related to data sets or one or more classes of such an ontology via operation 232, and can add or modify a policy of the policy repository 212 via operation 234.

The knowledge query and assertion processor 204 processes one or more asserted properties, instances or relationships involving one or more of the data sets in accordance with a model generated by the model manager 202. Also, the knowledge query and assertion processor 204 can process a query or modify knowledge request directed to at least a portion of the metadata in operation 236. The policy engine 208 also has input into the processing of the query or modify knowledge operation 236.

The knowledge manager and inference engine 206 interacts with the knowledge query and assertion processor 204 and the policy engine 208 using information stored in the associated data set knowledge repository 210.

The policy engine 208 generates a processing directive in operation 238 for one or more of the data processing elements 104 based on results of the reasoning operations performed by knowledge manager and inference engine 206 and at least one policy selected from a policy repository 212.

The processing directive operation 238 may initiate one or more actions in the data processing elements 104. For example, actions based on reasoning may be taken to preserve or reestablish constraints and assertions, to alter data set state, or to authorize (or prohibit) data set usage for specified purposes. Actions may be coordinated with business-driven workflows (e.g., in the context of an itinerary on an information service bus).

As is apparent from the above, the data set manager 102 performs instance level capture of ontologically defined relationships among data sets and thereby enables reasoning about properties, classifications and usage of these data sets. This represents a unified approach to describing and subsequently acting on metadata about data set provenance, versioning, volatility, derivation, caching, indexing, materialization, state, etc.

The data set manager 102 supports the description and maintenance of expressions such as policies, assertions, constraints and rules about individual data sets and across multiple, interrelated data sets. Data sets may be held in data stores, or they may be extracts or streams. Data sets may be created, transformed, refreshed or otherwise updated by agents or processes such as queries, services, filters, change propagators, copiers, replicators and integrators. As previously described, a data set may be a file, a relational table, a set of key-value pairs, a document, a block, or any other assemblage of data to be tracked.

It is to be appreciated that the particular sets of modules and other components implemented in the system 100 as illustrated in FIGS. 1 and 2 are presented by way of example only. In other embodiments, only subsets of these components, or additional or alternative sets of components, may be used, and such components may exhibit alternative functionality and configurations.

Figure 3:
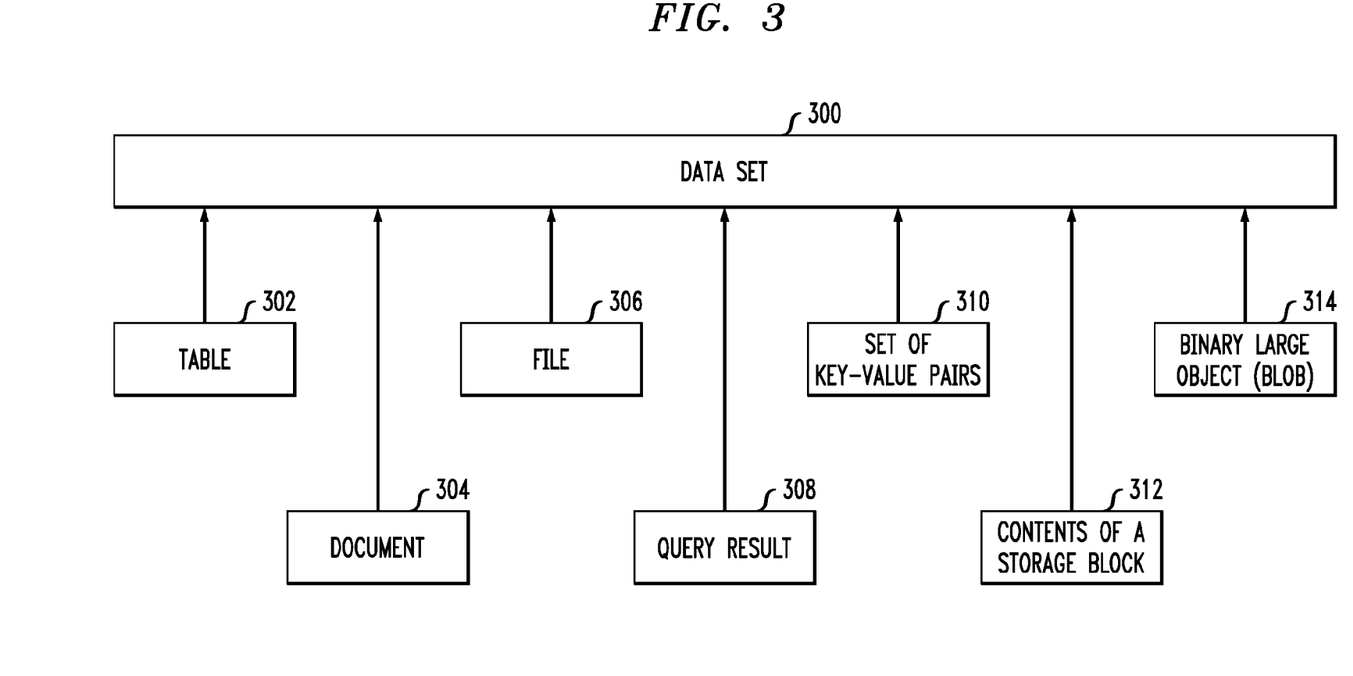
FIG. 3 illustrates specialized types of data sets that may be processed in the FIG. 1 system.

The data sets processed in the system 100 of FIGS. 1 and 2 will now be described in greater detail with reference to FIGS. 3 to 5.

As noted above, a data set is an abstraction of a data item or items. FIG. 3 illustrates a number of examples of possible types of data sets. In this embodiment, a data set 300 may comprise one or more of a table 302, a document 304, a file 306, a query result 308, a set of key-value pairs 310, contents of a storage block 312, and a binary large object (BLOB) 314. Of course, this list of possible data sets is presented by way of example only, and numerous other information entities may comprise respective data sets as that term is used herein. As other examples, information entities such as extensible markup language (XML) code or a logical unit number (LUN) identifying a logical unit in storage system may each be considered data sets as that term is used herein. As yet another example, a "logical" data set may be formed as a collection of other data sets.

Figure 4:
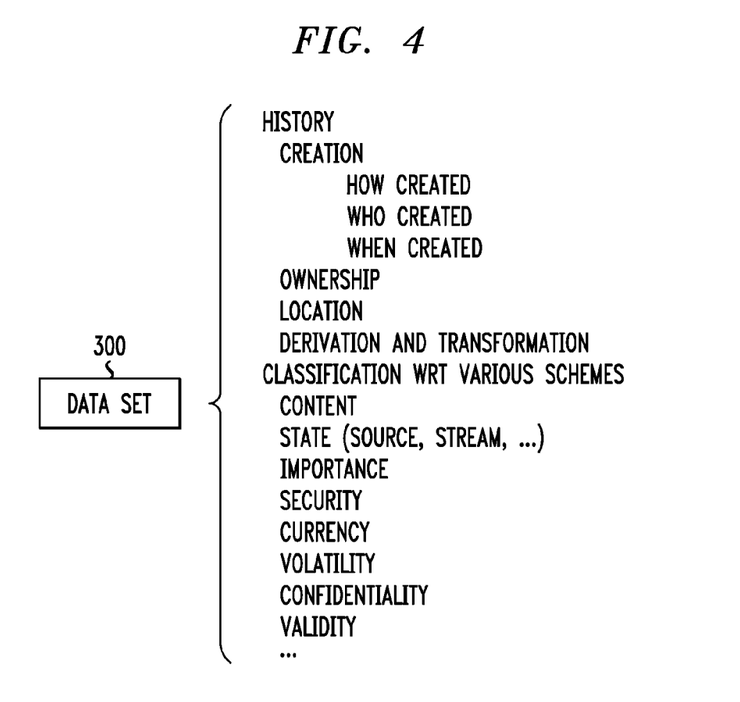
FIGS. 4 and 5 show examples of respective data set properties and inter data set relationships for at least one of the data set types of FIG. 3.
Figure 5:
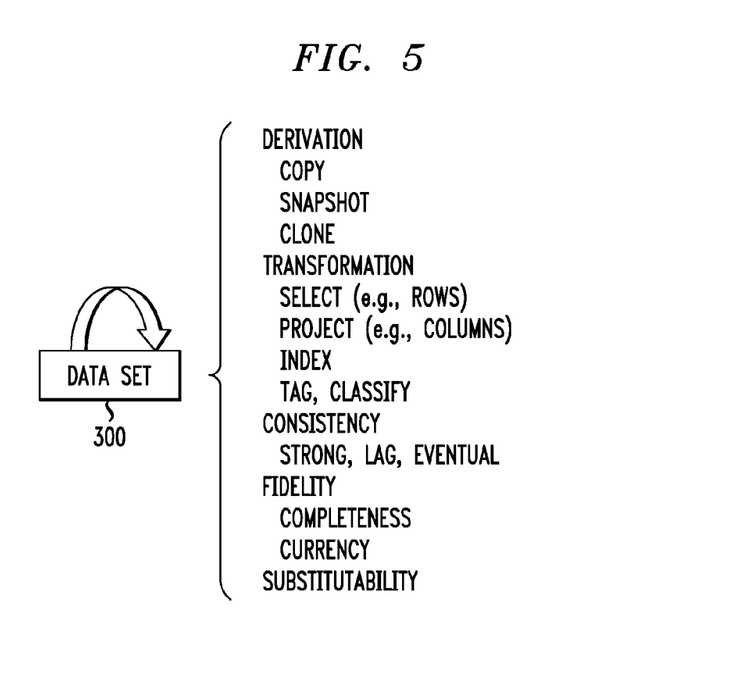

A given data set 300 has properties, examples of which are illustrated in FIG. 4. The specific examples shown include history of the data set, such as creation (e.g., how created, who created, when created), ownership, location, derivation and transformation. Other examples include classification of the data set with respect to various schemes, such as content, state (e.g., source, stream, etc.), importance, security, currency (i.e., how current the data set is), volatility, confidentiality, certification and validity. Again, the particular properties shown in the figure are presented by way of example only. Other possible data set properties in a given embodiment may include timestamp, storage (e.g., physical or virtual), encryption, cache status, completeness, quality, auditability, structure/shape (e.g., syntax, semantics, etc.) and context (e.g., operating system).

A given data set 300 also has relationships to other data sets. As illustrated in FIG. 5, exemplary relationships among two or more of the data sets may comprise derivation (e.g., copy, snapshot, clone), transformation (e.g., select, project, index, tag, classify), consistency (e.g., strong, lag, eventual), fidelity (e.g., completeness, currency) and substitutability of those data sets. Other examples may include version, extract, view, partition, mirror, summary, and collection or other grouping (e.g., history, tablespace, data mart). Data set relationships in a given embodiment may also involve access rights, usage rights, actions, applicability and consistency of policies, etc.

As noted above, the reasoning module 108 performs reasoning operations on the metadata characterizing data sets. These reasoning operations utilize knowledge manager and inference engine 206 and its associated data set knowledge repository 210, and may include reasoning operations such as, for example, determining if a given one of the data sets is suitable for a specified use (e.g., backup, substitution, audit, analysis, point-in-time reconstruction, performance optimization, index, etc.), determining one or more of the data sets that would be best for a specified use, determining if a policy related to one or more of the data sets is satisfied (e.g., every operational data set has a current backup), determining if the given data set originates from a particular source, determining if appropriate security safeguards have been applied to the given data set, determining if another data set can be substituted for the given data set, and determining if access controls of the given data set are appropriate to a current usage context.

These and other types of reasoning operations that utilize data set properties and interrelationships support many use cases that might otherwise be difficult to handle using conventional approaches.

Other examples of use cases that are accurately and efficiently supported by the data set manager 102 include the following:
1. What is the provenance and history of this data set?
2. Is this data set suitable for the intended use?
3. What action needs to be done to satisfy policies?
4. What is the relationship between data sets A and B?
5. What is the validity of the data set?
6. Does the data set satisfy a given policy?
7. Is a collection of data sets consistent?
8. Are data sets compatible for a given operation?
9. Is a service level objective (SLO) achievable by a data set?
10. What is exposure to a service level agreement (SLA) penalty?
11. Is a collection of data sets complete?
12. Is a data set from a trusted source?

Again, these use cases are examples only, and the data set manager 102 can be adapted for numerous other use cases.

As a more detailed illustration, the following are examples of use case scenarios from the health care domain that may be processed using the data set manager 102:
1. Is a patient data set (such as a virtual patient health record) current and consistent?

If not (e.g., if one of the data sources had updated test results that were not seen), a diagnosis may be wrong, or an unintended drug interaction may result.

2. Did certain test results come from a recognized source, e.g. a qualified provider or payor?

A clinician basing a medical decision on information that lacks adequate provenance and credible lineage may incur liability. If in doubt, the clinician may order a new set of tests, driving up costs.

3. Have appropriate security and privacy safeguards been applied to a derived data set that is about to be released to a researcher?

If not, there is the danger of civil and criminal penalties under HIPAA.

4. Can the state of knowledge about an epidemic be reconstructed for a point in time?

This can be achieved by annotating data sets with metadata that enables matching retention semantics and reasoning about consistency.

5. Can a federated query director use one data set to substitute for another?

As one possibility, an index may be used to substitute for an underlying table for query processing, thereby saving time.

6. How current are backups of a data set?

If these are not current enough according to applicable rules, then backup activities should be initiated.

7. What are the security and access constraints on a data set at this point in time, given the context of usage?

This is particularly challenging for dynamic data sets. The idea of context may include, for example, role of user requesting access (which may be mapped to a particular level in a multi-level security approach), intended usage, and policies associated with the data set itself. Policies may include temporal constraints such as expiration, and pattern constraints such as transaction velocity and volume. The results might be fed into a Policy Enforcement Point (PEP) or other processing element.

It was noted above that portions of the information processing system 100 may be implemented using one or more processing platforms. Illustrative embodiments of such platforms will now be described in greater detail.

Figure 6:
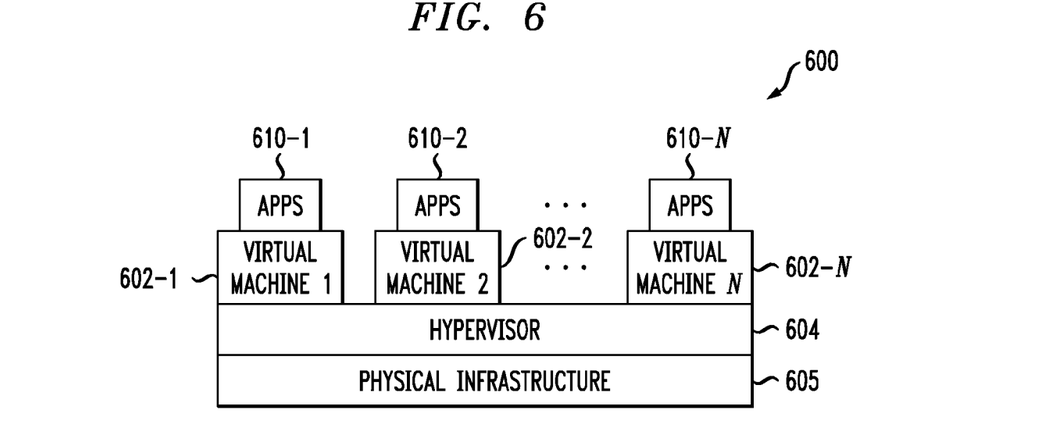
FIG. 6 illustrates cloud infrastructure that may be utilized to implement at least a portion of the FIG. 1 system.

As shown in FIG. 6, portions of the system 100 may comprise cloud infrastructure 600. The cloud infrastructure 600 comprises virtual machines (VMs) 602-1, 602-2, . . . 602-N implemented using a hypervisor 604. The hypervisor 604 is an example of what is more generally referred to herein as "virtualization infrastructure." The hypervisor 604 runs on physical infrastructure 605. The cloud infrastructure 600 further comprises sets of applications 610-1, 610-2, . . . 610-N running on respective ones of the virtual machines 602-1, 602-2, . . . 602-N under the control of the hypervisor 604.

Although only a single hypervisor 604 is shown in the embodiment of FIG. 6, the system 100 may of course include multiple hypervisors each providing a set of virtual machines using at least one underlying physical machine.

An example of a commercially available hypervisor platform that may be used to implement hypervisor 604 and possibly other portions of the IT infrastructure of system 100 in one or more embodiments of the invention is the VMware® VSphere™ which may have an associated virtual infrastructure management system such as the VMware® VCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the IT infrastructure of system 100.

One or more of the processing modules or other components of system 100 may therefore each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

Figure 7:
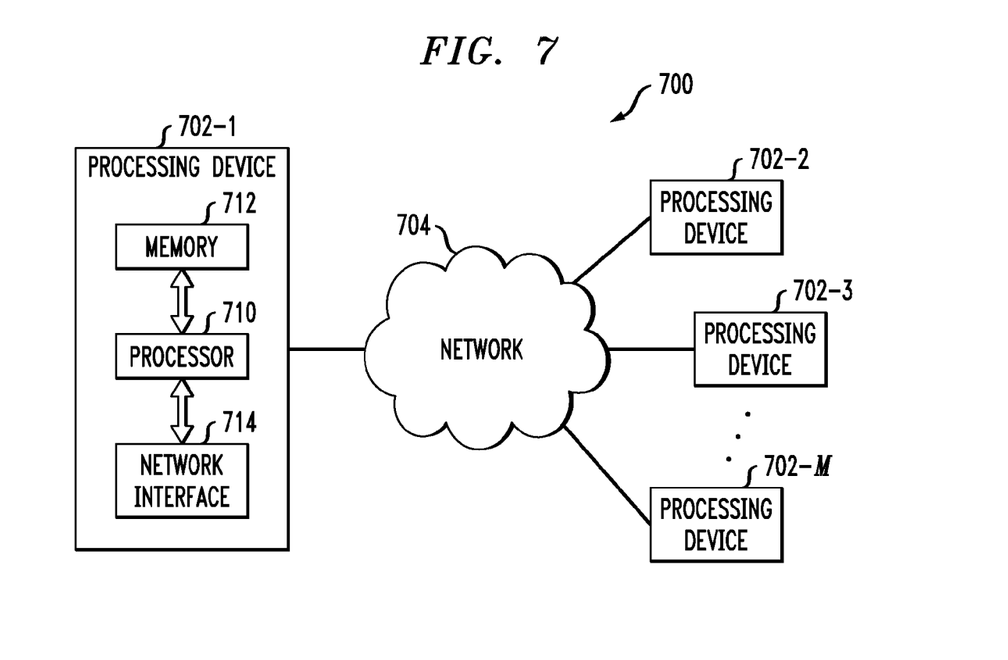
FIG. 7 shows an example of a processing platform that may be utilized to implement at least a portion of the FIG. 1 system.

The processing platform 700 in this embodiment comprises a portion of the system 100 and includes a plurality of processing devices, denoted 702-1, 702-2, 702-3, ... 702-M, which communicate with one another over a network 704.

The processing device 702-1 in the processing platform 700 comprises a processor 710 coupled to a memory 712. The processor 710 may comprise a microprocessor, a microcontroller, an application-specific integrated circuit (ASIC), a field programmable gate array (FPGA) or other type of processing circuitry, as well as portions or combinations of such circuitry elements. The memory 712 may be viewed as an example of what is more generally referred to herein as a "computer program product" having executable computer program code embodied therein. Such a memory may comprise electronic memory such as random access memory (RAM), read-only memory (ROM) or other types of memory, in any combination.

The computer program code when executed by a processing device such as the processing device 702-1 causes the device to perform functions associated with one or more of the modules or other components of system 100, such as the data set manager 102. One skilled in the art would be readily able to implement such software given the teachings provided herein. Other examples of computer program products embodying aspects of the invention may include, for example, optical or magnetic disks, or other storage devices, or suitable portions or combinations of such devices. In addition to storing computer program code, such storage devices will also generally be used to store data within system 100.

Also included in the processing device 702-1 is network interface circuitry 714, which is used to interface the processing device with the network 704 and other system components. Such circuitry may comprise conventional transceivers of a type well known in the art.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network, such as a wide area network (WAN), a local area network (LAN), a satellite network, a telephone or cable network, or various portions or combinations of these and other types of networks.

As indicated previously, data set management functionality as disclosed herein can be implemented at least in part in the form of one or more software programs stored in memory and executed by a processor of a processing device such as one of the virtual machines 602 or one of the processing devices 702. A memory having such program code embodied therein is an example of what is more generally referred to herein as a "computer program product."

It should again be emphasized that the above-described embodiments of the invention are presented for purposes of illustration only. Many variations may be made in the particular arrangements shown and described. For example, although described in the context of particular system and device configurations, the techniques are applicable to a wide variety of other types of information processing systems, processing devices and IT infrastructure arrangements. Numerous other embodiments within the scope of the appended claims will be readily apparent to those skilled in the art.

What is claimed is:

1. An apparatus comprising:

at least one processing device comprising a memory and a processor coupled to the memory, the at least one processing device implementing a data set manager configured to interact with data processing elements of an information processing system;

the data set manager comprising:

a metadata capture module configured to obtain metadata characterizing data sets associated with said data processing elements;

a reasoning module configured to perform one or more reasoning operations on the metadata; and an action recommendation module configured to identify one or more recommended actions for the data processing elements based at least in part on results of the one or more reasoning operations;

wherein the metadata characterizes properties of a given data set and relationships among the given data set and at least one other data set, the properties of the given data set comprising at least one property relating to a history of the data set and at least one property relating to a classification of the data set with respect to a given scheme;

wherein the metadata capture module comprises:

a data set discovery module coupled to one or more of the data processing elements and operative to obtain metadata characterizing the data sets therefrom; and a knowledge query and assertion processor operative to process one or more asserted properties or relationships of the given data set in accordance with a model generated by a model manager, the model specifying structural, semantic and format characteristics of the metadata;

wherein the model manager is part of a set of common services of the data set manager and is operative:

to add or modify at least one of an ontology and a class utilized by the knowledge query and assertion processor; and to add or modify a policy utilized by a policy engine of the action recommendation module;

wherein the knowledge query and assertion processor is operative to process a query or modify knowledge request directed to at least a portion of the metadata; and wherein the action recommendation module comprises a policy engine configured to generate a processing directive to initiate the one or more recommended actions for one or more of the data processing elements based on results of the one or more reasoning operations and at least one policy selected from a policy repository.

2. The apparatus of claim 1 wherein at least portions of common services of the data set manager are utilized by the metadata capture module, the reasoning module and the action recommendation module.

3. The apparatus of claim 2 wherein the set of common services comprises at least one of a data set knowledge repository which stores at least a portion of the metadata, and the policy repository which stores a plurality of policies for use by a policy engine of the action recommendation module.

4. The apparatus of claim 1 wherein at least a portion of the metadata is defined at least in part in accordance with at least one of a specified ontology and a specified class.

5. The apparatus of claim 1 wherein the properties relating to a history of the given data set comprise information characterizing one or more of at least creation, ownership, location, derivation and transformation, and wherein the properties relating to the classification of the data set with respect to the given scheme comprise information characterizing one or more of content, state, importance, security, currency, volatility, confidentiality, certification and validity of that data set.

6. The apparatus of claim 1 wherein the relationships among the given data set and at least one other data set comprise information characterizing one or more of at least derivation, transformation, consistency, fidelity and substitutability of those data sets.

7. The apparatus of claim 1 wherein the one or more reasoning operations comprise one or more of:
   determining if the given data set is suitable for a specified use;
   determining a best one or more of the data sets for a specified use;
   determining if a policy related to one or more of the data sets is satisfied;
   determining if the given data set originates from a particular source;
   determining if appropriate security safeguards have been applied to the given data set;
   determining if another data set can be substituted for the given data set; and
   determining if access controls of the given data set are appropriate to a current usage context.

8. The apparatus of claim 1 wherein the reasoning module comprises a knowledge manager and inference engine.

9. The apparatus of claim 1 wherein at least a subset of the data processing elements comprise one or more of security enforcement services, analytical applications, platform management services and infrastructure management services.

10. The apparatus of claim 1 wherein at least a subset of the data processing elements comprise processing devices of a processing platform of the information processing system.

11. A method comprising the steps of:
    capturing metadata characterizing data sets associated with data processing elements of an information processing system;
    performing one or more reasoning operations on the metadata; and
    identifying one or more recommended actions for the data processing elements based at least in part on results of the one or more reasoning operations;
    wherein the steps are performed by at least one processing device comprising a processor coupled to a memory;
    wherein the metadata characterizes properties of a given data set and relationships among the given data set and at least one other data set, the properties of the given data set comprising at least one property relating to a history of the data set and at least one property relating to a classification of the data set with respect to a given scheme;
    wherein the step of capturing metadata characterizing data sets comprises:
        obtaining metadata characterizing the data sets from one or more of the data processing elements;
        generating a model specifying structural, semantic and format characteristics of the metadata;
        processing one or more asserted properties or relationships of the given data set in accordance with the model;
        adding or modifying at least one of an ontology and a class relating to the data sets;
        adding or modifying at least one policy relating to the data sets; and
        processing a query or modify knowledge request directed to at least a portion of the metadata; and
    wherein the step of identifying one or more recommended actions for the data processing elements comprises generating a processing directive to initiate the one or more recommended actions for one or more of the data processing elements based on results of the one or more reasoning operations and at least one policy selected from a policy repository.

12. The method of claim 11 wherein the step of performing one or more reasoning operations on the metadata comprises performing one or more of:
    determining if the given data set is suitable for a specified use;
    determining a best one or more of the data sets for a specified use;
    determining if a policy related to one or more of the data sets is satisfied;
    determining if the given data set originates from a particular source;
    determining if appropriate security safeguards have been applied to the given data set;
    determining if another data set can be substituted for the given data set; and
    determining if access controls of the given data set are appropriate to a current usage context.

13. The method of claim 11 wherein the properties relating to a history of the given data set comprise information characterizing one or more of at least creation, ownership, location, derivation and transformation, and wherein the properties relating to the classification of the data set with respect to the given scheme comprise information characterizing one or more of content, state, importance, security, currency, volatility, confidentiality, certification and validity of that data set.

14. The method of claim 11 wherein the relationships among the given data set and at least one other data set comprise information characterizing one or more of at least derivation, transformation, consistency, fidelity and substitutability of those data sets.

15. The method of claim 11 wherein at least a subset of the data processing elements comprise one or more of security enforcement services, analytical applications, platform management services and infrastructure management services.

16. A computer program product comprising a non-transitory processor-readable storage medium having encoded therein executable code of one or more software programs, wherein the one or more software programs when executed cause a processing device to:
    capture metadata characterizing data sets associated with data processing elements of an information processing system;
    perform one or more reasoning operations on the metadata; and
    identify one or more recommended actions for the data processing elements based at least in part on results of the one or more reasoning operations;
    wherein the metadata characterizes properties of a given data set and relationships among the given data set and at least one other data set, the properties of the given data set comprising at least one property relating to a history of the data set and at least one property relating to a classification of the data set with respect to a given scheme:

wherein capturing metadata characterizing data sets comprises:
- obtaining metadata characterizing the data sets from one or more of the data processing elements;
- generating a model specifying structural, semantic and format characteristics of the metadata;
- processing one or more asserted properties or relationships of the given data set in accordance with the model;
- adding or modifying at least one of an ontology and a class relating to the data sets;
- adding or modifying at least one policy relating to the data sets; and
- processing a query or modify knowledge request directed to at least a portion of the metadata; and wherein identifying one or more recommended actions for the data processing elements comprises generating a processing directive to initiate the one or more recommended actions for one or more of the data processing elements based on results of the one or more reasoning operations and at least one policy selected from a policy repository.

17. The computer program product of claim 16 wherein the properties relating to a history of the given data set comprise information characterizing one or more of at least creation, ownership, location, derivation and transformation, and wherein the properties relating to the classification of the data set with respect to the given scheme comprise information characterizing one or more of content, state, importance, security, currency, volatility, confidentiality, certification and validity of that data set.

18. The computer program product of claim 16 wherein the relationships among the given data set and at least one other data set comprise information characterizing one or more of at least derivation, transformation, consistency, fidelity and substitutability of those data sets.

19. The computer program product of claim 16 wherein at least a subset of the data processing elements comprise one or more of security enforcement services, analytical applications, platform management services and infrastructure management services.

20. The computer program product of claim 16 wherein the one or more reasoning operations comprise one or more of:
- determining if the given data set is suitable for a specified use;
- determining a best one or more of the data sets for a specified use;
- determining if a policy related to one or more of the data sets is satisfied;
- determining if the given data set originates from a particular source;
- determining if appropriate security safeguards have been applied to the given data set;
- determining if another data set can be substituted for the given data set; and
- determining if access controls of the given data set are appropriate to a current usage context.

* * * * *